US010320290B2

(12) United States Patent
Peker et al.

(10) Patent No.: US 10,320,290 B2
(45) Date of Patent: Jun. 11, 2019

(54) VOLTAGE REGULATOR WITH SWITCHING AND LOW DROPOUT MODES

(71) Applicant: Microsemi Corporation, Aliso Viejo, CA (US)

(72) Inventors: Arkadiy Peker, Glen Cove, NY (US); Bernard Drexler, Gieres (FR); Tamir Reshef, Sunnyvale, CA (US); Reghu Rajan, San Diego, CA (US)

(73) Assignee: Microsemi Corporation, Chandler, AZ (US)

( * ) Notice: Subject to any disclaimer, the term of this patent is extended or adjusted under 35 U.S.C. 154(b) by 458 days.

(21) Appl. No.: 14/454,134

(22) Filed: Aug. 7, 2014

(65) Prior Publication Data

US 2015/0042300 A1 Feb. 12, 2015

Related U.S. Application Data

(60) Provisional application No. 61/864,200, filed on Aug. 9, 2013.

(51) Int. Cl.
*G05F 1/575* (2006.01)
*H02M 3/156* (2006.01)
(Continued)

(52) U.S. Cl.
CPC ......... *H02M 3/156* (2013.01); *H02M 3/1588* (2013.01); *H02M 2001/0045* (2013.01); *Y02B 70/1466* (2013.01)

(58) Field of Classification Search
CPC ..... H02M 2003/1552; H02M 3/15822; H02M 3/1584; H02M 3/156; H02M 3/1588; H02M 2001/0045; Y02B 70/1466; G05F 1/575
(Continued)

(56) References Cited

U.S. PATENT DOCUMENTS 5,705,919 A * 1/1998 Wilcox ................... G05F 1/618
 323/268
7,230,408 B1 * 6/2007 Vinn ..................... H02M 3/156
 323/273
(Continued)

OTHER PUBLICATIONS

Timothy Hegarty, "Voltage-mode Control and Compensation: Intricacies for Buck Regulators", National Semiconductor, EDN Network, Jun. 30, 2008, 22 pages.

*Primary Examiner* — Jue Zhang
*Assistant Examiner* — Lorena D Bruner
(74) *Attorney, Agent, or Firm* — Glass & Associates; Kenneth Glass

(57) ABSTRACT

A voltage regulator includes an input terminal, an output terminal, a control circuitry, a buck mode switching converter, and a low dropout regulator circuit. The buck mode switching converter is arranged to convert a voltage signal received at the input terminal to a first voltage signal at the output terminal responsive to a first predetermined signal output from the control circuitry. The buck mode switching converter includes an electronically controlled switch in communication with an energy storage element. The low dropout regulator circuit is coupled between the input terminal and the output terminal and includes a linear circuit and is arranged to control a voltage drop across the linear circuit so as to provide a second voltage signal at the output terminal responsive to a second predetermined signal output from the control circuitry.

17 Claims, 7 Drawing Sheets

(51) Int. Cl.
*H02M 3/158* (2006.01)
*H02M 1/00* (2006.01)

(58) Field of Classification Search
USPC .......................................................... 323/268
See application file for complete search history.

(56) References Cited

U.S. PATENT DOCUMENTS

| | | | | |
|---|---|---|---|---|
| 7,990,120 B2* | 8/2011 | Leonard | ................ | H02M 3/156 323/224 |
| 8,242,764 B2* | 8/2012 | Shimizu | .............. | H02M 3/1588 323/284 |
| 2004/0178777 A1* | 9/2004 | Bayadroun | ........... | H02M 3/156 323/274 |
| 2007/0057658 A1* | 3/2007 | Hasegawa | ........... | H02M 3/1588 323/282 |
| 2009/0302816 A1* | 12/2009 | Kunimatsu | ............. | H02M 1/36 323/282 |
| 2010/0207571 A1* | 8/2010 | English | ............. | H01M 10/0525 320/101 |
| 2010/0320983 A1* | 12/2010 | Wu | ..................... | H02M 3/1584 323/283 |
| 2011/0241651 A1* | 10/2011 | Oda | ........................ | G06F 3/044 324/76.39 |
| 2012/0169304 A1* | 7/2012 | Isik | ......................... | H02M 3/07 323/266 |
| 2013/0063111 A1* | 3/2013 | Ivanov | ................ | H02M 3/1588 323/280 |
| 2013/0094553 A1* | 4/2013 | Paek | ........................ | H03F 1/32 375/222 |
| 2013/0176008 A1* | 7/2013 | Li | ........................... | H02M 1/36 323/273 |
| 2013/0193941 A1* | 8/2013 | DeFazio | ................... | G05F 1/46 323/282 |
| 2014/0159688 A1* | 6/2014 | Peker | .................. | H02M 3/1582 323/282 |
| 2014/0253062 A1* | 9/2014 | Qin | ........................ | G05F 1/10 323/271 |
| 2014/0253081 A1* | 9/2014 | Duncan | ..................... | G05F 1/10 323/284 |
| 2015/0155783 A1* | 6/2015 | Li | ........................ | H03F 1/0227 323/271 |
| 2016/0065139 A1* | 3/2016 | Lee | ....................... | H03F 1/0227 330/278 |

* cited by examiner

VOLTAGE REGULATOR WITH SWITCHING AND LOW DROPOUT MODES

CROSS REFERENCE TO RELATED APPLICATIONS

This application claims priority to the U.S. Provisional Patent Application 61/864,200, filed on Aug. 9, 2013, the entirety of which is incorporated herein by reference.

BACKGROUND

Field of the Disclosure

The present disclosure generally relates to powering electronic devices, and more particularly, to a voltage regulator with switching and low dropout modes.

Description of the Related Art

Voltage regulators are used to provide power supplies for electronic devices. Different types of voltage regulators exhibit different voltage stability, noise, and regulation efficiency characteristics. Switching voltage regulators, such as buck mode voltage regulators, periodically couple an input voltage source to an energy storage element to generate an output voltage. Due to the periodic nature of the switching, the output voltage has an inherent ripple, making it less effective for noise sensitive devices, such as radios, especially during a receive mode of the radio.

In noise-sensitive applications, a low dropout (LDO) regulator may be used. A low dropout regulator couples an input voltage to an energy storage element using a transistor operating in a linear mode, thereby eliminating the ripple inherent in a switching voltage regulator.

Power consumption is another tradeoff associated with voltage regulators. Some electronic devices are powered by batteries, so a low efficiency voltage regulator will result in a reduced battery capacity. The relative efficiencies associated a switching voltage regulator versus an LDO regulator vary depending on the relationship between the input voltage and the output voltage. An LDO regulator may have improved noise characteristics, but lower efficiency than a switching regulator, resulting in increased current draw from the battery and lower battery capacity.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-8 illustrate example circuits and techniques for powering a wireless sensor module using an energy harvesting device, a rechargeable power storage device, and a primary battery. The primary battery may be a non-rechargeable battery, such as a chemical battery, that provides power to the rechargeable power storage device during periods of low output by the energy harvesting device, which results in the draining of the rechargeable power storage device. The selected power source is provided to a voltage regulator to generate a supply voltage for powering at least a radio in the wireless sensor module. The voltage regulator may be selectively controlled to operate in a switching mode or a low dropout (LDO) mode depending on the operational state of the radio and/or the difference between the input and output voltages seen by the voltage regulator.

Figure 1:
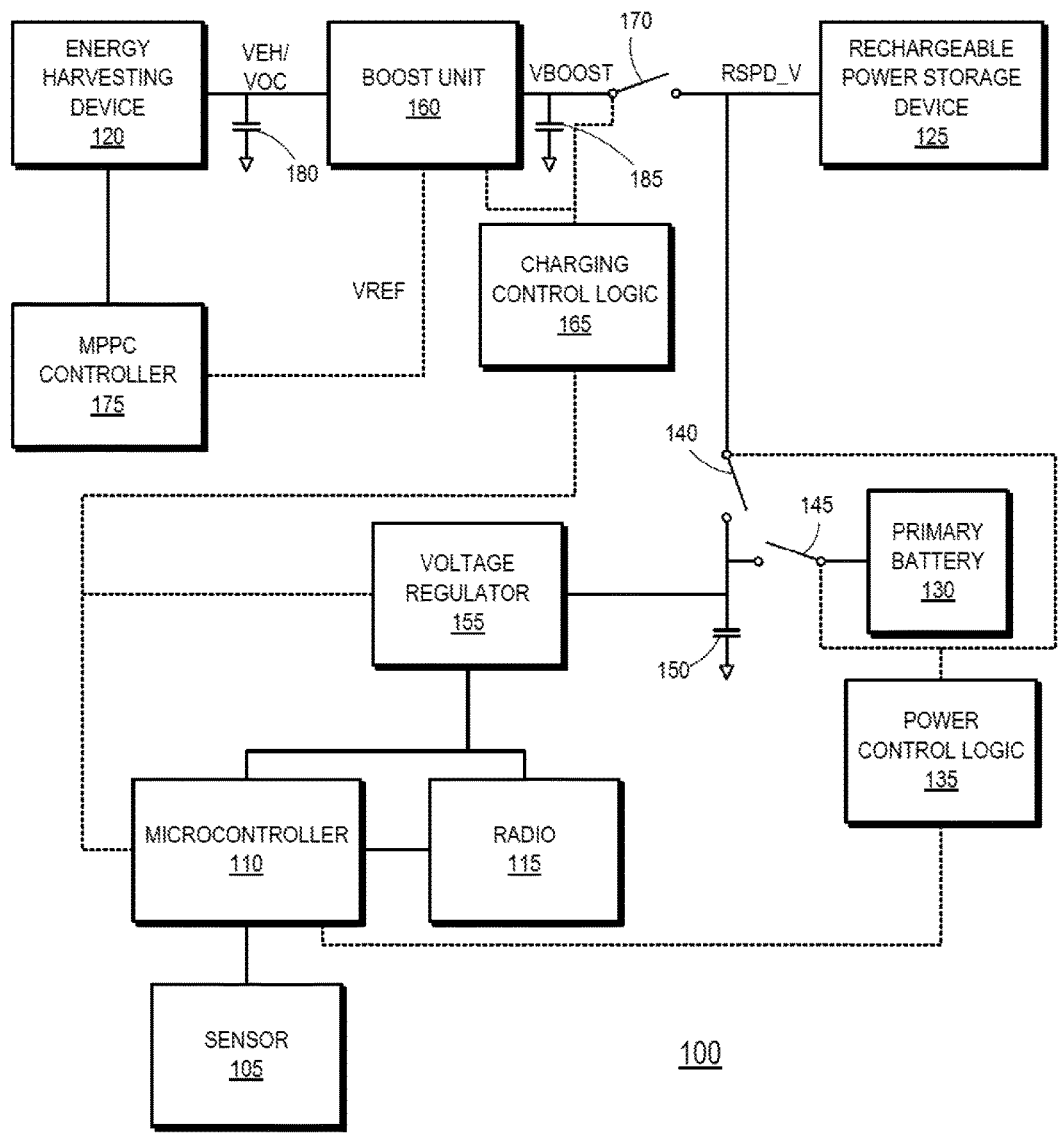
FIG. 1 is a block diagram of a wireless sensor module in accordance with some embodiments.

FIG. 1 is a simplified block diagram of a wireless sensor module 100. The wireless sensor module 100 includes a sensor 105 supported by a microcontroller 110, a radio 115 for communicating data collected by the sensor 105, an energy harvesting device 120 (e.g., a solar panel, thermoelectric device, etc.) for charging a rechargeable power storage device (RPSD) 125 (e.g., a rechargeable battery, super-capacitor, or capacitor), and a primary battery 130 (e.g., a chemical battery). Power control logic 135 selects between the RPSD 125 and the primary battery 130 for powering the sensor 105 and the radio 115 using RPSD switch 140 and primary battery switch 145 (e.g., transistors) coupled to a power supply capacitor 150. A voltage regulator 155 receives power from the power source selected by power control logic 135 and generates a supply voltage for the sensor 105 and the radio 115. A boost unit 160 may be provided between the energy harvesting device 120 and the RPSD 125 to increase the charging voltage. Charging control logic 165 selectively couples the boost unit 160 to the RPSD 125 using a switch 170 and provides an enable signal for the boost unit 160. A maximum power point controller (MPPC) 175 provides a reference signal to the boost unit 160 for optimizing the power transfer from the energy harvesting device 120. An energy harvesting capacitor 180 is charged by the energy harvesting device 120 for providing an input voltage to the boost unit 160. A boost capacitor 185 is charged by the boost unit 160 for providing a voltage for charging the RPSD 125. In general, the boost unit 160 receives an input voltage at one level and generates an output voltage at a second level higher than the first level. The construct and operation of the boost unit 160 are known to those of ordinary skill in the art, so they are not described in greater detail herein.

In some embodiments, the boost unit 160, the control logic 135, 165, the MPPC controller 175, and the voltage regulator 155 may be provided in a single integrated circuit device chip, the microcontroller 110 and radio 115 may be provided on another chip, and the other components may be coupled to the chips or to a printed circuit board to which the chips are mounted.

In general, the power control logic 135 and the charging control logic 165 cooperate to increase the reliability of the RPSD 125 by controlling the conditions under which it provides power and is charged.

Figure 2:
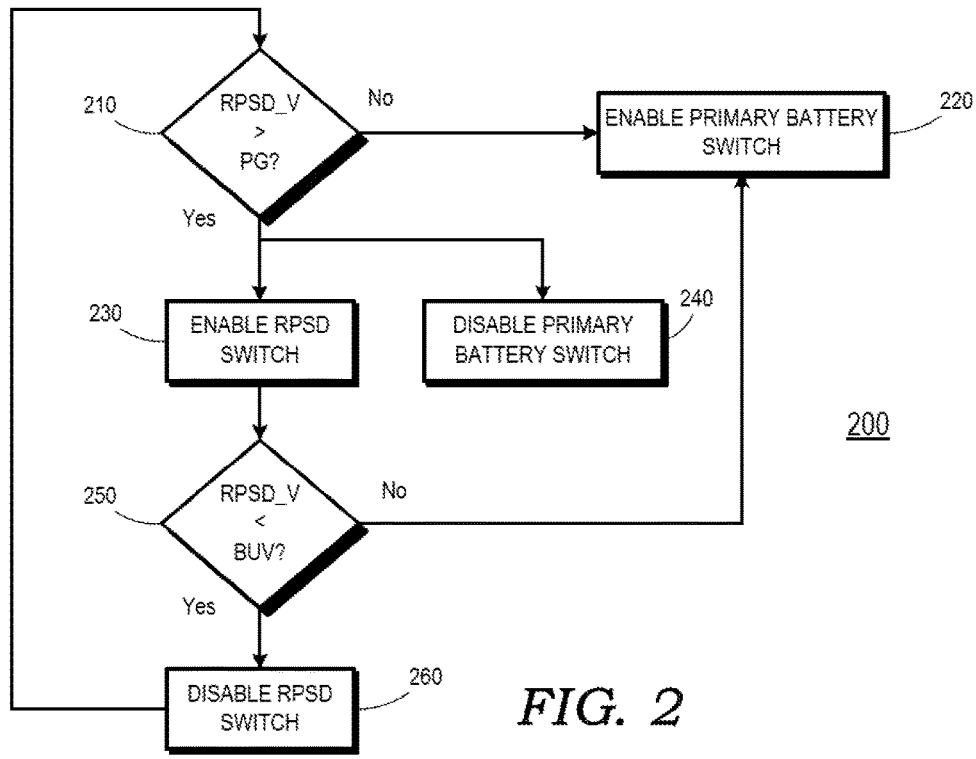
FIG. 2 is a flow diagram of the logic employed by power control logic in the module of FIG. 1 in accordance with some embodiments.

FIG. 2 is a flow diagram 200 of the logic employed by the power control logic 135 in accordance with some embodiments. In block 210, the power control logic 135 determines if the output voltage of the RPSD 125, "RPSD_V," is greater than a power good threshold, "PG." If RPSD_V is not greater than PG, indicating that the RPSD 125 is not ready to provide power for the wireless sensor module 100, the primary battery switch 145 is enabled in block 220. If RPSD_V is greater than PG, the RPSD switch 140 is enabled in block 230, and the primary battery switch 145 is disabled in block 240. If RPSD_V falls below a battery undervoltage threshold, "BUV," in block 250, the RPSD switch 140 is disabled in block 260. Thus, the RPSD 125 is charged by the energy harvesting device 120 until the power good threshold is surpassed, whereafter it is selected to provide power to the sensor module 100. The RPSD 125 is subsequently disconnected when the battery undervoltage threshold is reached, indicating that a maximum allowed discharged state of the RPSD 125 has been reached. Thus, the voltage on the RPSD 125 cycles between BUV and voltages of PG and above.

Figure 3:
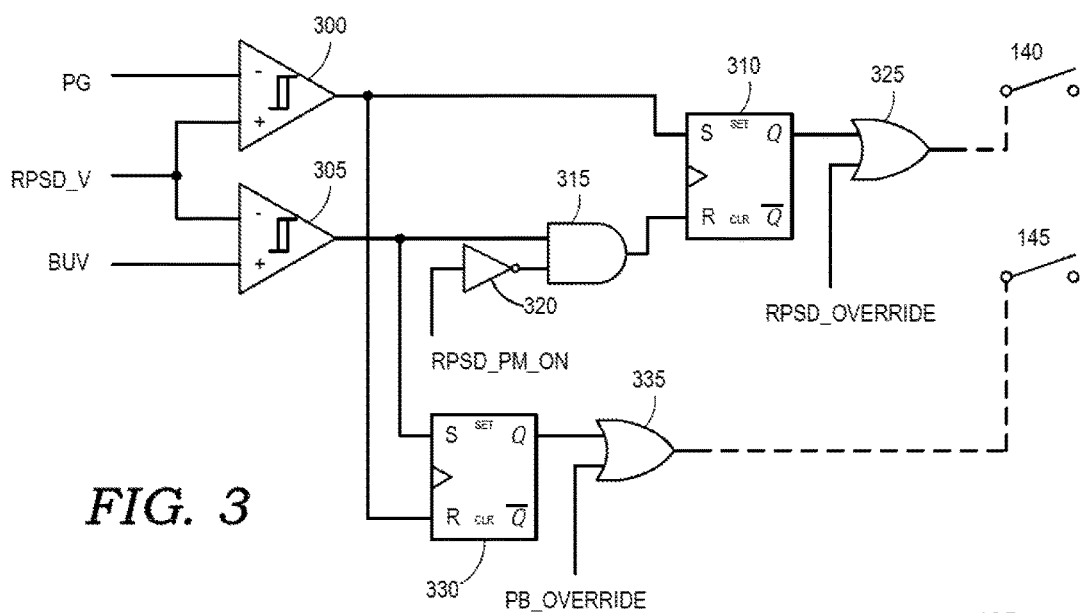
FIG. 3 is a circuit diagram of the power control logic described in FIG. 2 in accordance with some embodiments.

FIG. 3 is a circuit diagram of the power control logic 135 in accordance with some embodiments. The power control logic 135 includes comparators 300, 305 for determining whether RPSD_V meets the PG threshold or the BUV threshold, respectively. In particular, RPSD_V is coupled to the inverting input of the comparator 305 and to the non-inverting input of the comparator 300. Signal PG is coupled to the inverting input of the comparator 300 and signal BUV is coupled to the non-inverting input of the comparator 305. The output of the comparator 300 is coupled to a set terminal of a latch 310. The output of the comparator 305 is coupled to a first input of an AND gate 315, and the output of the AND gate 315 is in turn coupled to a reset terminal of the latch 310. The AND gate 315 also receives a power management enable signal, "RPSD_PM_ON," through an inverter 320 at a second input thereof. The output of the latch 310 is coupled to a first input of an OR gate 325. The output of OR gate 325 enables the RPSD switch 140. The output of the comparator 305 is additionally coupled to a set input of a latch 330. The output of the comparator 300 is additionally coupled to a reset input of the latch 330. An output of the latch 330 is coupled to a first input of an OR gate 335, and an output of the OR gate 335 enables the primary battery switch 145. A second input of the OR gate 325 may receive an override signal, "RPSD_OVERRIDE," from the microcontroller 110 for forcing the RPSD 125 to be enabled, and a second input of the OR gate 335 may receive an override signal, "PB_OVERRIDE" from the microcontroller 110 for forcing the primary battery 130 to be enabled.

When the comparator 300 determines that RPSD_V>PG it sets the latch 310, thereby enabling the RPSD switch 140 through the OR gate 325 and resets the latch 330 to disable the PB switch 145. When the comparator 305 determines that RPSD_V<BUV, it resets the latch 310 via the AND gate 315 if the power management mode is enabled by RPSD_PM_ON, thereby disabling the RPSD switch 140 through the OR gate 325. The output of the comparator 305 also sets the latch 330 when RPSD_V<BUV to enable the PB switch 145 via the OR gate 335. The override signals RPSD_OVERRIDE and PB_OVERRIDE allow the microcontroller 110 to force one of the power sources 125, 130 to provide power for operations it deems critical.

Controlling the selection between the RPSD 125 and the primary battery 130 as described above increases the life of the primary battery 130 and therefore decreases the maintenance cost associated with changing the primary battery 130, and also increases system reliability in the event the energy harvesting device 120 cannot generate enough power to keep the RPSD 125 charged (e.g., on a cloudy day or during the night in the case of a solar panel).

Figure 4:
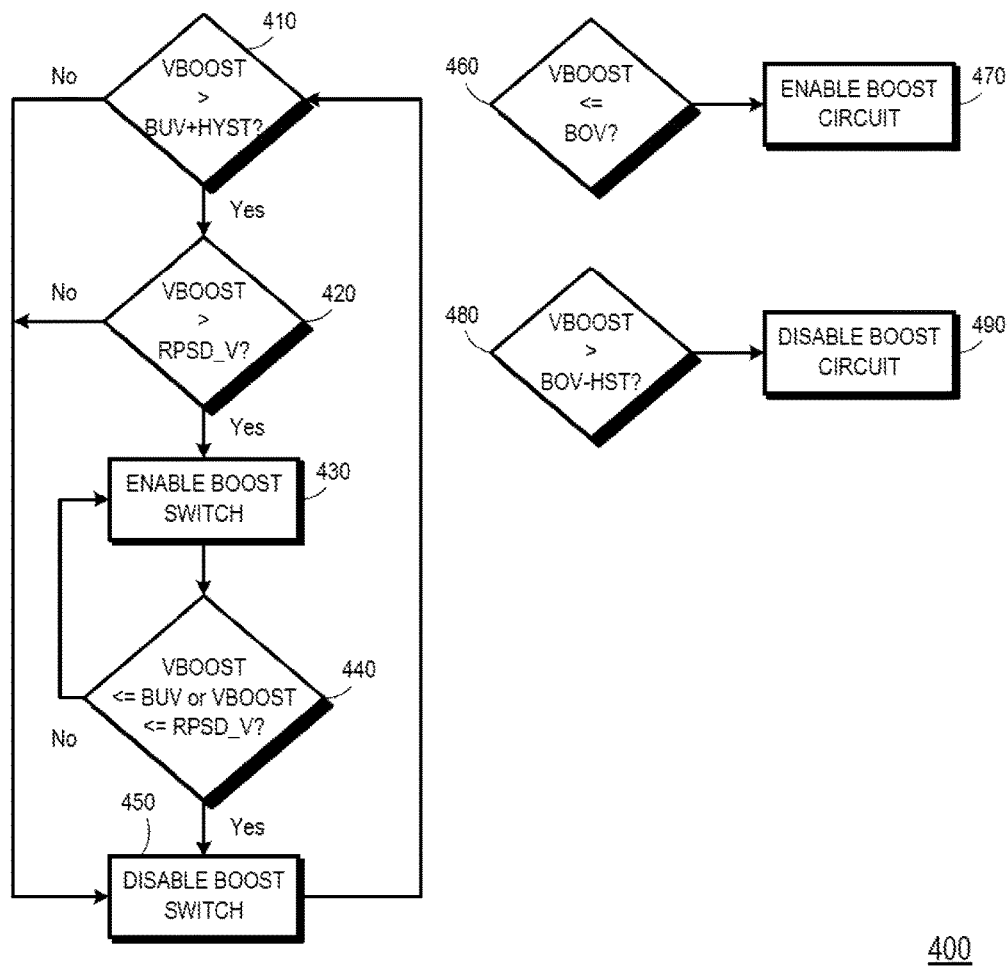
FIG. 4 is a flow diagram of the logic employed by charging control logic in the module of FIG. 1 in accordance with some embodiments.

FIG. 4 is a flow diagram 400 of the logic employed by the charging control logic 165 for enabling the boost switch 170 in accordance with some embodiments. In an initial condition represented by block 405, the boost switch 170 is disabled. In block 410, the charging control logic 165 determines if the voltage at the boost capacitor 185, "VBOOST," is greater than BUV plus a hysteresis offset, "HYST1." If VBOOST>BUV+HYST1, the charging control logic 165 determines if VBOOST is also greater than RPSD_V in block 420. If VBOOST>RPSD_V in block 420, the boost switch 170 is enabled in block 430 to charge the RPSD 125. If the conditions of blocks 410, 420 are not met, no action is taken and the method loops until the conditions are met. If VBOOST is not greater than RPSD_V, enabling the boost switch 170 would actually discharge the RPSD 125. In block 440, the charging control logic 165 determines if VBOOST<=BUV or VBOOST<=RPSD_V and disables the boost switch 170 in block 450 if either of the conditions are met.

The charging control logic 165 also selectively enables the boost unit 160. When VBOOST is less than or equal to an overvoltage level, "BOV" minus a hysteresis offset, "HYST2," in block 460, the boost unit 160 is enabled in block 470. If the condition of block 460 is not met, no action is taken and the method loops until the condition is met. When the boost switch 170 is closed, VBOOST tracks RPSD_V, because the boost capacitor 185 is coupled directly to the RPSD 125. When VBOOST is greater than BOV in block 480, the boost unit 160 is disabled in block 490, thereby preventing the RPSD 125 from being exposed to excessive voltage. If the condition of block 480 is not met, no action is taken and the method loops until the condition is met. Hence, the battery charge voltage will ripple between BOV and BOV-HYST2 levels. The hysteresis values HYST1, HYST2 may vary depending on the particular implementation, and they may or may not have the same value.

Figure 5:
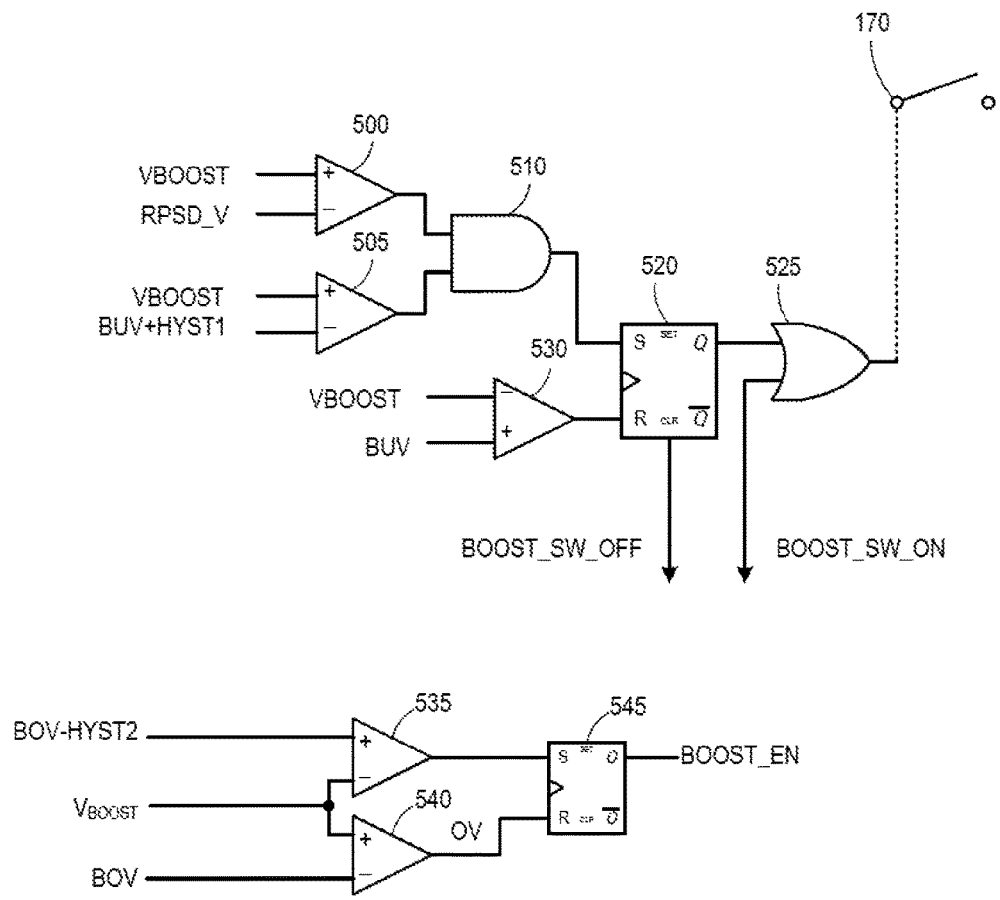
FIG. 5 is a circuit diagram of the charging control logic described in FIG. 4 in accordance with some embodiments.

FIG. 5 is a circuit diagram of the charging control logic 165 in accordance with some embodiments. A comparator 500 determines if VBOOST>RPSD_V (to prevent discharging the RPSD 125), and a comparator 505 determines if VBOOST>BUV+HYST1 (to enable charging). The outputs of comparators 500, 505 are coupled to respective inputs of an AND gate 510, which asserts its output if both conditions are true, thereby setting a latch 520. The output of the latch 520 is coupled to the boost switch 170 through a first input of an OR gate 525. The OR gate 525 also receives an override signal, "BOOST_SW_ON," at a second input from the microcontroller 110 to force the boost switch 170 to be enabled. A comparator 530 determines if VBOOST<=BUV and resets the latch 520 if the logical condition is met. The microcontroller 110 may also provide an override signal, "BOOST-SW-OFF," coupled to the clear input of the latch 520 for forcing the boost switch 170 open by holding the output of the latch 520 de-asserted.

For controlling the enabling of the boost unit 160, the charging control logic 165 includes a comparator 535 that determines if VBOOST<=BOV-HYST2 and a comparator 540 that determines if VBOOST>BOV (indicating an overvoltage condition). The output of the comparator 535 sets a latch 545 to assert an enable signal, "BOOST_EN," for enabling the boost unit 160, and the output of the comparator 540 resets the latch to remove the BOOST_EN signal when the boost voltage exceeds the overvoltage threshold, indicated as OV.

Controlling the boost switch 170 and selectively enabling the boost unit 160 prevents overcharging the RPSD 125 or discharging the RPSD 125 when its voltage is higher than the boost voltage. These measures extend the operating life of the RPSD 125, thereby reducing maintenance costs and increasing availability.

The boost unit 160 transfers power generated by the energy harvesting device 120 to the RPSD 125. The MPPC controller 175 maximizes the power extracted from energy harvesting device 120. To achieve maximum power transfer from the energy harvesting device 120, its impedance is matched to the system load impedance. The MPPC controller 175 determines the optimum input voltage operating point for a given type of energy harvesting source. The boost unit 160 regulates the input voltage by controlling boost duty cycle of the switching scheme used to generate the boost voltage. During the "on" portion of the duty cycle, power is transferred from the energy harvesting capacitor 180 to the boost capacitor 185. During the "off" portion of the duty cycle (open circuit), the energy harvesting capacitor 180 is charged by the energy harvesting device 120.

In some embodiments, the MPPC controller 175 may implement static control, where the input voltage to the boost unit 160 is controlled at a fixed value. In other embodiments, a dynamic approach may be used to determine the optimal input voltage. For example, a static approach may be effective for a solar cell, where the optimal point is generally fixed, while a dynamic approach may be used for a thermoelectric energy harvesting device, where the optimal point varies with the temperature differential across the device.

In general, the most efficient power transfer occurs when the voltage at the energy harvesting capacitor 180 equals a particular percentage of the open circuit voltage. In a fixed control mode, the MPPC controller 175 provides a constant reference voltage, VREF, to the boost unit 160. In a dynamic mode, the MPPC controller 175 measures the open circuit voltage, VOC, at the energy harvesting capacitor 180 during off portions of the duty cycle and provides the open circuit voltage as a reference to the boost unit 160. For solar energy harvesting devices, VREF is configured by the MPPC controller 175 to correspond to approximately 0.7-0.8 of VOC, and for thermoelectric energy harvesting devices, the reference is configured by the MPPC controller 175 to correspond to approximately 0.5 of VOC. Of course, these values may vary depending on the actual energy harvesting device 120 employed.

In both static and dynamic control modes, the boost unit 160 compares the voltage at the energy harvesting capacitor 180, VEH, during the on portion of the duty cycle to VREF and adjusts the duty cycle based on the difference. If VEH is higher than VREF, the duty cycle is increased, and if VEH is less than VREF, the duty cycle is decreased. In this manner, the voltage at which power is transferred from the energy harvesting device 120 is optimized.

Figure 6:
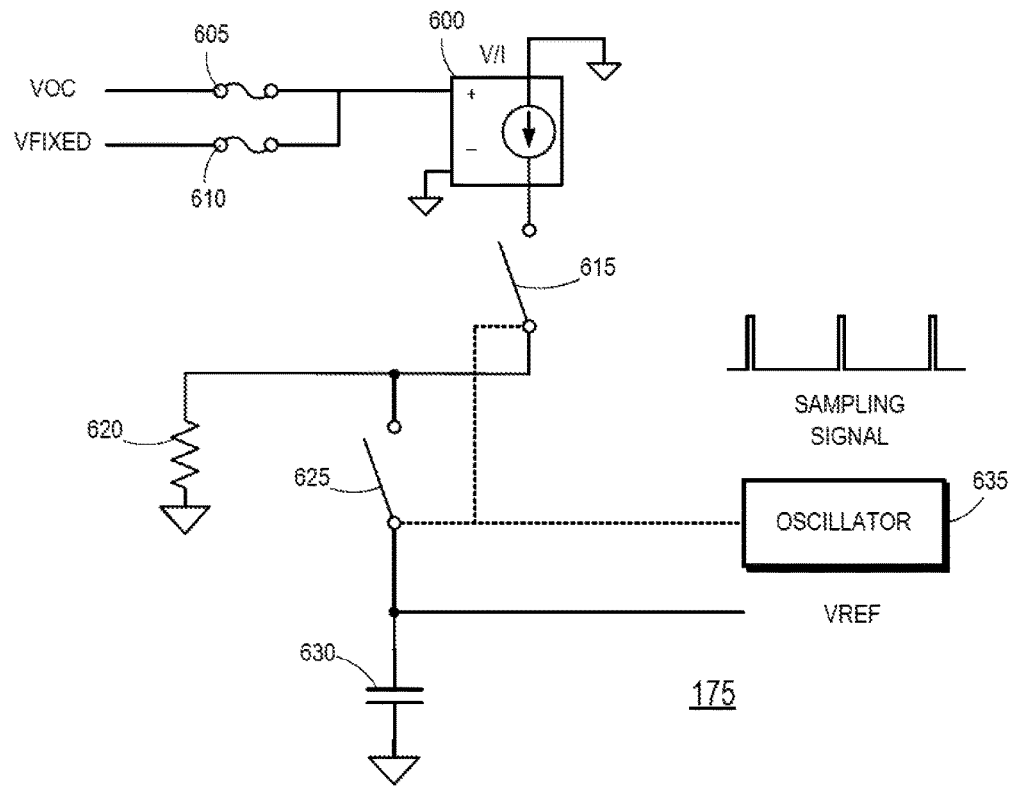
FIG. 6 is a circuit diagram of a maximum power point controller in the module of FIG. 1 in accordance with some embodiments.

FIG. 6 is a circuit diagram of the MPPC controller 175 in accordance with some embodiments. The MPPC controller 175 includes a buffer 600 (e.g., a voltage-controlled current source) that receives an input voltage and generates a current proportional thereto. When static MPPC is employed, a fixed voltage, VFIXED, may be coupled to the buffer 600, while when dynamic MPPC is employed, VOC may be provided to the buffer 600. Fuses 605, 610 may be provided to allow the MPPC mode to be configured for a particular user. The fuses 605, 610 may be replaced with switches (e.g., transistors) if the MPPC mode may be changed during operation (e.g., by setting a configuration register in the microcontroller 110). A switch 615 couples the buffer 600 to an MPPC resistor 620, and a switch 625 couples the MPPC resistor 620 to an MPPC capacitor 630. During the off cycle of the boost duty cycle, the switches 615, 625 are closed. The particular input voltage coupled to the buffer 600 causes the buffer 600 to generate a current, which charges the MPPC capacitor 630. The voltage on the MPPC capacitor 630 will depend on the level of the input voltage, the gain of the buffer 600, and the value of the MPPC resistor 620, such that it is possible to select the value of the MPPC resistor 620 to set the ratio between the input voltage and the voltage at the MPPC capacitor 630, denoted "VREF," (e.g., VREF=k*(VOC or VFIXED), where k may be selected depending on the type of energy harvesting device, as described above. During the on portion of the boost duty cycle, the switches 615, 625 are opened, resulting in VREF being present on the capacitor 630 for use by the boost unit 160 for setting the duty cycle. A sampling signal may be provided to the switches 615, 625 by an oscillator 635 to reduce the power consumption of the MPPC controller 175. Advantageously, the input voltage is not continuously measured, so power is only consumed during the sampling interval set by the sampling signal output by the oscillator 635.

Figure 7:
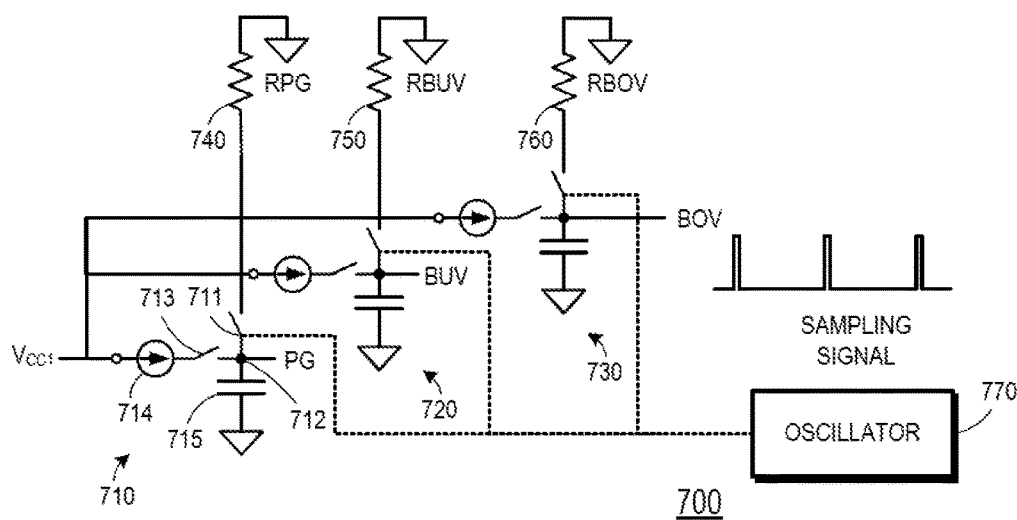
FIG. 7 is diagram of a configuration circuit that may be employed to set the values of the various thresholds used in the module of FIG. 1 in accordance with some embodiments.

Various control thresholds have been described for use by the power control logic 135 and the charging control logic 165, such as PG, BUV, and BOV. In some embodiments, the particular values for these thresholds may be configured by setting a configuration in the microcontroller 110. In some embodiments, a user may configure these values by selecting values of resistors coupled to configuration pins. FIG. 7 is a diagram of a configuration circuit 700 that may be employed to set the values of the various thresholds used in the wireless sensor module 100 in accordance with some embodiments so as to avoid excess power loss. The value for each threshold is set by a respective sample and hold circuit 710, 720, 730. An RPG resistor 740 sets the value for the PG threshold in the circuit 710, an RBUV resistor 750 sets the value for the BUV threshold in the circuit 720, and an RBOV resistor 760 sets the value for the BOV threshold in the circuit 730. The components of the sample and hold circuits 710, 720, 730 are the same, so only one (e.g., the circuit 710) is described in detail. The sample and hold circuit 710 includes a switch 711 for selectively coupling the RPG resistor 740 to a node 712, and a switch 713 for selectively coupling a current source 714 to the node 712. A capacitor 715 is also coupled to the node 712. When the switches 711, 713 are closed, the current source 714 charges the capacitor 715 to a voltage depending on the magnitude of the current and the value of the RPG resistor 740. The output of the sample and hold circuit 710, PG, is represented by the voltage at the node 712 when the switches 711, 713 are open. A user may configure the PG threshold by selecting the value of the RPG resistor 740. Similarly, the values for the BUV and BOV thresholds may be selected by configuring the respective RBUV and RBOV resistors 750, 760. A sampling signal may be provided by an oscillator 770 to control the sampling interval. The sample and hold circuits 710, 720, 730 only consume power during the time interval that the switches 711, 713 are closed.

Figure 8:
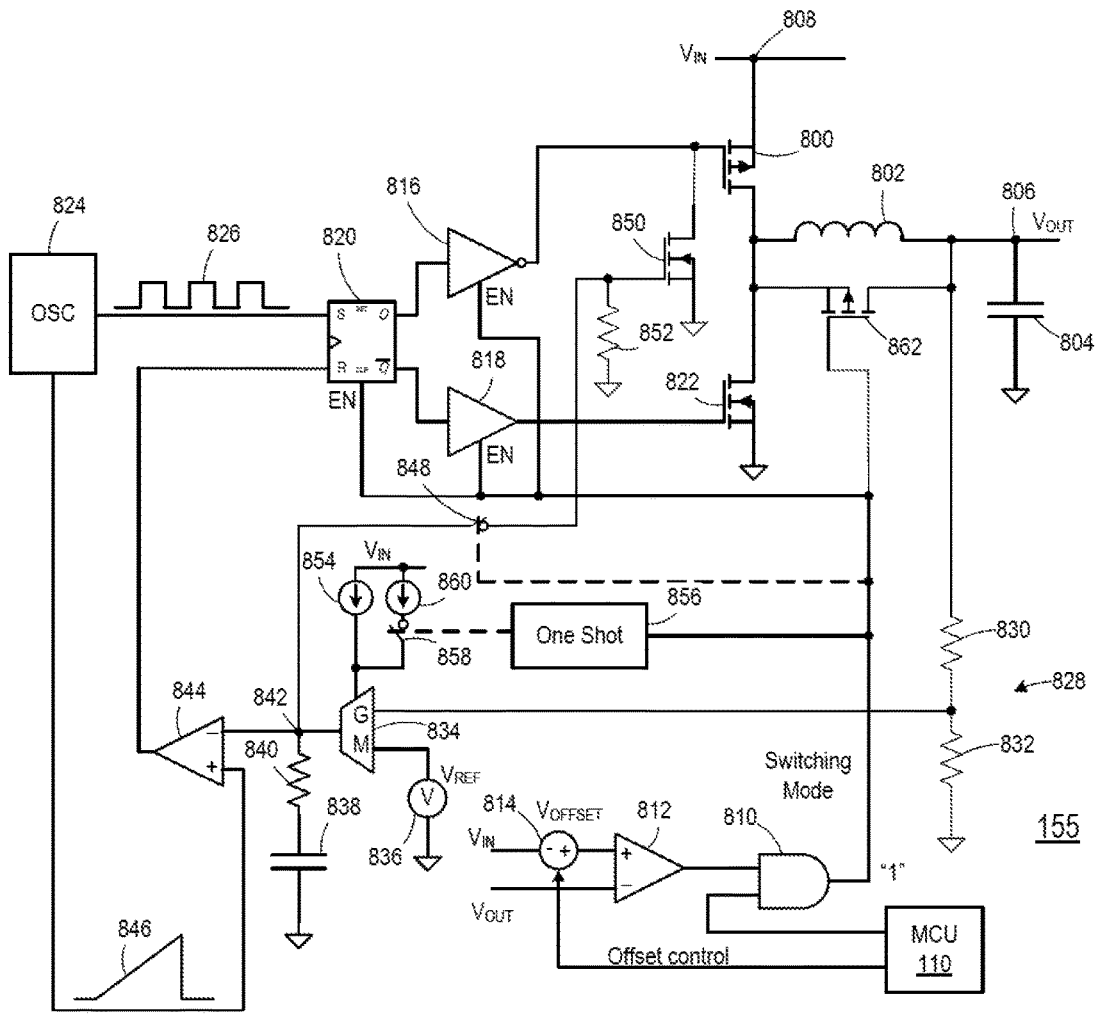
FIG. 8 is a circuit diagram of the voltage regulator in the module of FIG. 1 highlighting switching mode components in accordance with some embodiments.
Figure 9:
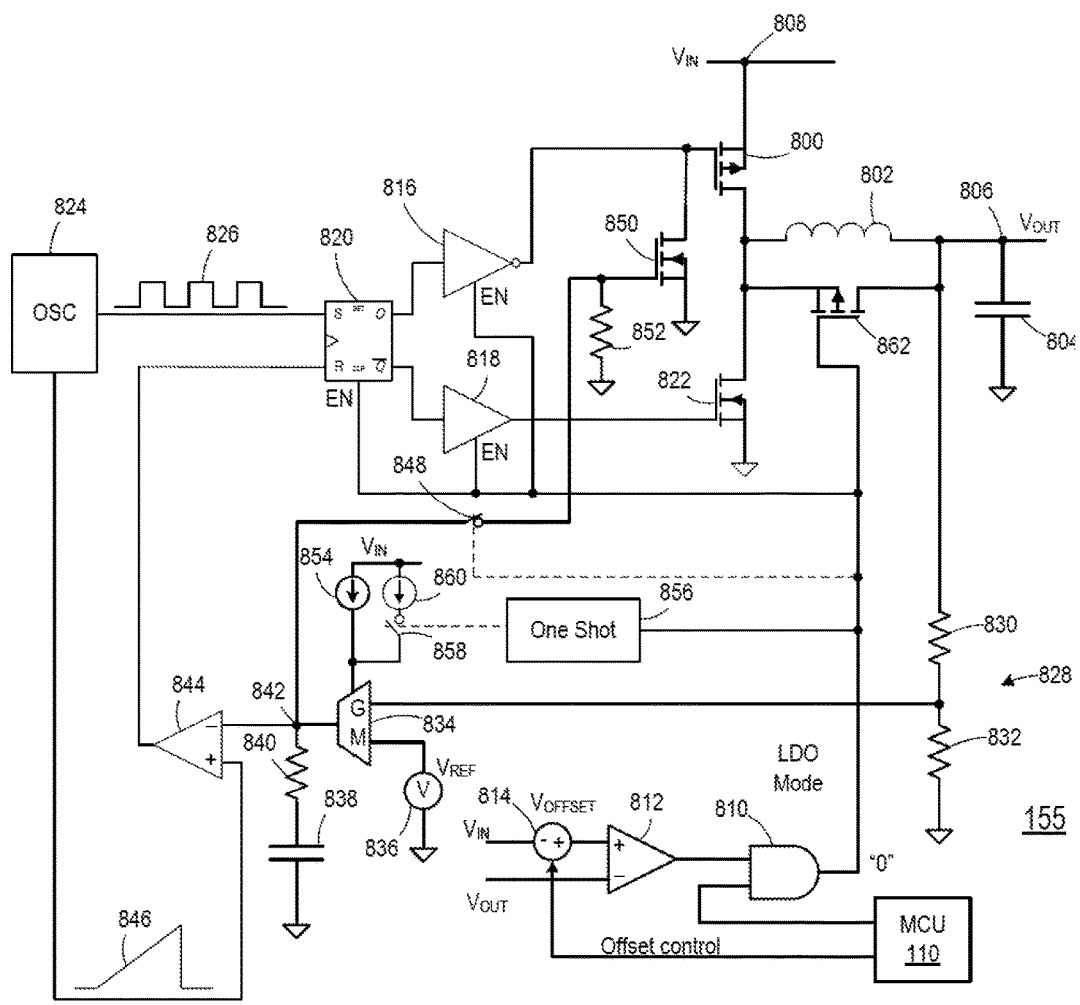
FIG. 9 is a circuit diagram of the voltage regulator in the module of FIG. 1 highlighting low dropout mode components in accordance with some embodiments.

FIG. 8 is a circuit diagram of the voltage regulator 155 in accordance with some embodiments. The voltage regulator 155 may operate in a switching mode (e.g., a buck) or a low dropout (LDO) mode, depending on the relationship between the input voltage and the output voltage, or depending on the operating mode of the radio 115. In FIG. 8, the components employed to operate in switching mode are bold. FIG. 9 illustrates the same circuit as FIG. 8, but the components employed to operate in LDO mode are bold.

The voltage regulator 165 includes a power transistor 800 (e.g., a P-type MOSFET) that may be operated in switching mode or LDO mode to store energy in an inductor 802 and/or a capacitor 804 for generating an output voltage, "$V_{OUT}$," at an output terminal 806 based on an input voltage, "$V_{IN}$," at an input terminal 808. An AND gate 810 receives a control signal from the microcontroller 110 at a first input and a control signal from a comparator 812 that compares the input and output voltages at a second input. The various control signals are asserted, or de-asserted, to alternately allow switching mode and LDO mode. Hence, the voltage regulator 155 operates in switching mode when the output of the AND gate 810 is asserted, which corresponds to the control signals from both the comparator 812 and the microcontroller 110 being asserted. The voltage regulator 155 operates in an LDO mode when the output of the AND gate 810 is de-asserted, which corresponds to either the comparator 812 or the microcontroller 110 de-asserting their control signals.

The microcontroller 110 may control the operating mode of the voltage regulator 165 based on the operational state of the radio 115, and the comparator 812 may control the operating mode based on the relationship between the input and output voltages. For example, during noise sensitive operating modes of the radio 115 (e.g., receive, transmit, or both) the microcontroller 110 may select the LDO mode by de-asserting its control signal at the first input of the AND gate 810. From a power consumption standpoint, LDO mode is generally more efficient than switching mode when the input voltage is near the output voltage. An offset voltage 814 configurable by the microcontroller 110 is provided in series with the input voltage at a first input of the comparator 812 for determining a threshold at which LDO mode is selected. The comparator 812 also receives the output voltage at a second input terminal. The comparator 812 de-asserts its output to select LDO mode when $V_{IN} - V_{OFFSET} < V_{OUT}$. The offset voltage source 814 defines the proximity threshold for $V_{OUT}$ and $V_{IN}$ to trigger LDO mode.

The output of the AND gate 810 is coupled to enable terminals of switching drivers 816, 818 and a clear terminal of the switching latch 820. The driver 816 controls the power transistor 800, and the driver 818 controls a switching transistor 822 (e.g., an N-type MOSFET). An oscillator 824 provides a switching signal 826 for periodically setting the latch 820 to assert the driver 816 to enable the power transistor 800.

A feedback path for generating an error signal between the output voltage and a reference voltage, $V_{REF}$, includes a voltage divider 828 defined by resistors 830, 832 coupled to one input of a transconductance (GM) error amplifier 834. A reference voltage source 836 is coupled to a second input of the error amplifier 834. The error amplifier 834 generates an output current proportional to the error between the voltage at the voltage divider 828 and the reference voltage. The output current of the error amplifier 834 charges a capacitor 838 through a resistor 840 to generate an error voltage at a node 842. The desired value for the output voltage may be configured by selecting the resistance values of the resistors 830, 832, 840, the capacitance of the capacitor 838, and the gain of the error amplifier 834. The capacitor 838 and resistor 840 at the node 842 provide stability in both switching mode and LOD mode.

The node 842 is coupled to one input of a comparator 844. An output of the oscillator 824 is coupled to a second input of the comparator 844 and arranged to provide a ramp signal 846 for voltage mode control during switching mode. An output of the comparator 844 is coupled to a reset input of the latch 820. The node 842 is also coupled to a gate input of a transistor 850 (e.g., an N-type MOSFET) through a normally closed switch 848. An output of the transistor 850, illustrated as the drain terminal thereof, is coupled to a gate electrode of the power transistor 800 for controlling the power transistor 800 based on the error signal during LDO mode. A resistor 852 is coupled to the gate electrode of the transistor 850 to drain the charge thereon when the switch 848 is opened during switching mode. The error amplifier 834 is powered by a current source 854. During a transition from LDO mode to switching mode, a one shot 856 generates a pulse to close a normally open switch 858 to couple a second current source 860 to the error amplifier 834 to increase its gain, as described in greater detail below. The output of the AND gate 810 is further provided to the gate of an optional transistor 862 (e.g., P-type MOSFET) for selectively shorting out the inductor 802 in LDO mode.

When the output of the AND gate 810 is asserted, the voltage regulator 155 operates in switching mode, as illustrated in FIG. 8. The asserted output of the AND gate enables the drivers 816, 818 and the latch 820 and opens the switch 848. During the "on" portion of the switching signal 826, the latch 820 is set, causing the driver 816 to provide a logic "0" to the gate terminal of the power transistor 800 to turn it on and causing the driver 818 to provide a logic "0" to the gate terminal of the transistor 822 to turn it off. In general, when the power transistor 800 is enabled, the inductor 802 and capacitor 804 are charged. When the error voltage generated by the error amplifier 834 at the node 842 matches the ramp voltage of the signal 846 in the comparator 844, the latch 280 is reset. Since the lower level of the output of the common mode error voltage at the output of the error amplifier 834 does not go exactly to zero (i.e., corresponding to the voltage at the voltage divider 828 matching the reference voltage), the error signal is intersected with the ramp. When the error voltage falls below the ramp voltage a pulse is generated by the comparator 844 to reset the latch 280. Resetting the latch 820 inverts its outputs, hereby turning off the power transistor 800 and turning on the switching transistor 822 to power the load attached to the voltage regulator 155 using the energy stored in the inductor 802 and the capacitor 804. The inductor 820 is discharged by the load until the switching signal 826 subsequently sets the latch 820 to charge the inductor 802 and capacitor 804.

When the output of the AND gate 810 is de-asserted, the voltage regulator 155 operates in LDO mode. The de-asserted output of the AND gate disables the drivers 816, 818 and the latch 820, enables the transistor 862 to short the inductor 802 if the optional transistor 862 is provided, and closes the switch 848. The switch 848 couples the output of the error amplifier 834 at the node 842 to the transistor 850. The magnitude of the error signal determines how strongly the transistor 850 turns on to control the voltage drop across the power transistor 800. The transistors 800, 850 operate in linear mode. Because the transistor 850 is N-type and the transistor 800 is P-type, the transistor 850 generates a control signal for the power transistor 800 that is inversely proportional to the error signal. That is, an increase in the error signal turns on the transistor 850 more strongly, which in turn, pulls the voltage at the gate terminal of the power transistor 800 closer to ground and turns it on more strongly to increase the current taken from the input voltage source to charge the capacitor 804 and feed the load attached to the node 806. In LDO mode, the capacitor 804 also acts as a filter for rejecting high frequency noise at the output.

In most applications, the current in LDO mode is less than the current in switching mode. In this situation, when the mode switches from LDO to buck, a large current load transient may cause a significant drop in the output voltage, especially since the current to transconductance error amplifier 834 is limited, and therefore the gain is not high. To improve the transient response, the loop requires high gain, which requires a high supply current for the error amplifier 834. The one shot 856 generates a short pulse to connect the current source 860 to supply current to temporarily increase the gain of the error amplifier 834 responsive to connection of the current source 860.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The voltage regulator management techniques described herein increase the operational readiness and reliability of the wireless sensor module 100, thereby decreasing the operating cost. Controlling the operating mode of the voltage regulator 155 allows the noise and power characteristics of the output voltage to be tailored to the operating environment of the wireless sensor module 100. For example, during noise-sensitive radio operations, the microcontroller 110 may de-assert its control signal to force a lower noise LDO mode. During other radio operation modes, such as during a sleep period, the operating mode of the voltage regulator 155 may be selected by the comparator 812 to reduce power consumption. Because the input voltage for the voltage regulator 155 depends on whether the RPSD 125 or the primary battery 130 is selected and depends on the relative charge state of the selected power source, the relationship between the input voltage and the output voltage may continuously change. Selectively changing the operating mode of the voltage regulator 155 based on this relationship to increase power efficiency results in extending the operating life of the power sources 125, 130.

As disclosed herein, in some embodiments a voltage regulator includes an input terminal, an output terminal, a control circuitry, a buck mode switching converter, and a low dropout regulator circuit. The buck mode switching converter is arranged to convert a voltage signal received at the input terminal to a first voltage signal at the output terminal responsive to a first predetermined signal output from the control circuitry. The buck mode switching converter includes an electronically controlled switch in communication with an energy storage element. The low dropout regulator circuit is coupled between the input terminal and the output terminal and includes a linear circuit and is arranged to control a voltage drop across the linear circuit so as to provide a second voltage signal at the output terminal responsive to a second predetermined signal output from the control circuitry.

As disclosed herein, in some embodiments a wireless sensor module includes a sensor, a voltage regulator, and a control circuitry. The voltage regulator is coupled to receive an input voltage signal and operable to generate an output voltage signal for powering a radio. The voltage regulator includes a first transistor coupled between an input terminal and an output terminal, an energy storage element coupled to the output terminal, and a control circuitry. The control circuitry includes an error amplifier operable to generate an error signal based on a difference between an output voltage signal at the output terminal and a reference voltage signal, a switching circuit coupled to the first transistor and operable to provide a switching signal to the first transistor for charging the energy storage device using an input voltage signal received on the input terminal based on the error signal, and a linear circuit coupled to the first transistor and operable to provide a linear signal for operating the first transistor in a linear mode for charging the energy storage device using the input voltage signal based on the error signal. A controller is operable to selectively enable the switching circuit in a buck mode for generating the output voltage signal or to enable the linear circuit in a low dropout mode for generating the output voltage signal responsive to an operating mode of the radio.

As disclosed herein, in some embodiments a method for powering a wireless sensor module includes generating an output voltage signal at a voltage regulator for powering a sensor and a radio in the wireless sensor module, and selectively operating the voltage regulator in one of a low dropout mode or a buck mode to generate the output voltage signal responsive to a control signal provided to the voltage regulator.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A voltage regulator comprising:
an input terminal for receiving an input voltage signal;
an output terminal;
a first transistor coupled between the input terminal and the output terminal;
a second transistor coupled between the first transistor and a ground reference terminal;
an energy storage element coupled between the first transistor and the output terminal;
an error amplifier operable to generate an error signal based on a difference between an output voltage signal at the output terminal and a reference voltage signal;
a control circuitry operable to add or subtract an offset voltage from one of the input voltage signal and the output voltage signal, operable to compare the results of the adding or subtracting to the other of the input voltage signal and the output voltage signal and operable to select between asserting a first predetermined signal output and asserting a second predetermined signal output based on the comparison;
a switching circuit including an oscillator to generate a switching signal and a latch operable responsive to the error signal to receive the switching signal and generate a first drive signal and a second drive signal complimentary with respect to the first drive signal, the first drive signal coupled to a first gate terminal of the first transistor and the second drive signal coupled to a second gate terminal of the second transistor, wherein the switching circuit is responsive to the first predetermined signal output from the control circuitry to operate in a buck mode to generate the output voltage signal; and
a linear circuit coupled to the output of the error amplifier and coupled to the first gate terminal of the first resistor, wherein the linear circuit is responsive to the second predetermined signal output from the control circuitry to provide a linear signal based on the error signal to the first gate terminal of the first transistor for operating the first transistor in a low dropout mode to generate the output voltage signal.

2. The voltage regulator of claim 1, wherein the control circuitry is operable to enable the latch in the buck mode and disable the latch in the low dropout mode.

3. The voltage regulator of claim 1, wherein the error amplifier comprises a current error amplifier operable to generate an output signal having a current having a magnitude based on the difference, and the voltage regulator further comprises:
a current source;
a switch coupled between the current source and a gain terminal of the error amplifier; and
logic operable to selectively close the switch during a startup period associated with entering the buck mode to increase a gain of the error amplifier.

4. The voltage regulator of claim 1, wherein the linear circuit comprises:
a third transistor coupled to the first gate terminal of the first transistor and having a gate input coupled to the error amplifier to receive the error signal and generate the linear signal responsive to the error signal; and
a switch coupled between the error amplifier and the gate input of the third transistor, wherein the control circuitry is operable to open the switch in the buck mode and close the switch in the low dropout mode.

5. The voltage regulator of claim 4, wherein the energy storage element comprises:
a capacitor coupled to the output terminal; and
an inductor coupled between the first transistor and the output terminal, and
wherein the linear circuit further comprises a fourth transistor coupled between the first transistor and the output terminal, and the controller is operable to enable the fourth transistor to short the inductor in the low dropout mode.

6. The voltage regulator of claim 1, wherein the control circuitry is further operable to select between asserting the first predetermined signal output and asserting the second predetermined signal output based on an operating mode of a device receiving power from the voltage regulator.

7. A wireless sensor module, comprising:
a sensor; and
a voltage regulator having an input terminal coupled to receive an input voltage signal and having an output terminal coupled to the sensor, the voltage regulator operable to generate an output voltage signal at the output terminal for powering the sensor and a radio, the voltage regulator comprising:
a first transistor coupled between the input terminal and the output terminal,
an energy storage device coupled between the first transistor and the output terminal,
an error amplifier operable to generate an error signal having a current having a magnitude based on a difference between the output voltage signal and a reference voltage signal,
a switching circuit including an oscillator operable in a buck mode to generate a switching signal and a latch operable responsive to the error signal in the buck mode to receive the switching signal and generate a first drive signal coupled to a first gate terminal of the first transistor for charging the energy storage device using the input voltage signal,
a current source,
a switch coupled between the current source and a gain terminal of the error amplifier,
logic operable to selectively close the switch during a startup period associated with entering the buck mode to increase a gain of the error amplifier,
a linear circuit coupled to the first transistor and operable to provide a linear signal based on the error signal to the first gate terminal of the first transistor for operating the first transistor in a low dropout mode for charging the energy storage device using the input voltage signal, and
a controller operable to selectively enable the switching circuit in the buck mode for generating the output voltage signal and to enable the linear circuit in a low dropout mode for generating the output voltage signal responsive to an operating mode of the radio.

8. The wireless sensor module of claim 7, wherein the controller is operable to enable the latch in the buck mode and disable the latch in the low dropout mode.

9. The wireless sensor module of claim 7, wherein the linear circuit comprises:
a second transistor coupled to the first gate terminal of the first transistor and having a gate input coupled to the error amplifier to receive the error signal and generate the linear signal responsive to the error signal; and a switch coupled between the error amplifier and the gate input of the second transistor, wherein the controller is operable to open the switch in the buck mode and close the switch in the low dropout mode.

10. The wireless sensor module of claim 9, wherein the energy storage device comprises:
a capacitor coupled to the output terminal; and
an inductor coupled between the first transistor and the output terminal,
wherein the linear circuit further comprises a third transistor coupled between the first transistor and the output terminal, and the controller is operable to enable the third transistor to short the inductor in the low dropout mode.

11. The wireless sensor module of claim 7, wherein the controller is operable to operate the voltage regulator in the low dropout mode during a receive mode of the radio.

12. The wireless sensor module of claim 7, wherein the controller is operable to select between the buck mode and the low dropout mode based on a comparison between the input voltage and the output voltage.

13. The wireless sensor module of claim 12, wherein the controller is operable to select the low dropout mode responsive to the input voltage signal being greater than the output voltage signal by less than a predetermined threshold.

14. A voltage regulator comprising:
a first transistor coupled between an input terminal and an output terminal;
an energy storage element coupled between the first transistor and the output terminal;
an error amplifier operable to generate an error signal having a current having a magnitude based on the difference between an output voltage signal at the output terminal and a reference voltage signal;
a switching circuit coupled to the first transistor, the switching circuit operable responsive to the error signal in a buck mode to provide a first drive signal to a first gate terminal of the first transistor for charging the energy storage element;
a current source;
a switch coupled between the current source and a gain terminal of the error amplifier;
a control circuitry,
wherein, responsive to a first predetermined signal output from said control circuitry, the voltage regulator is configured to operate in the buck mode to convert an input voltage signal received at the input terminal to the output voltage signal; and
logic operable to selectively close the switch during a startup period associated with entering the buck mode to increase a gain of the error amplifier,
a linear circuit coupled to the output of the error amplifier and coupled to the first gate terminal of the first transistor, the linear circuit responsive to a second predetermined signal output from the control circuitry to provide a linear signal based on the error signal to the first gate terminal of the first transistor for operating the first transistor in a low dropout mode to generate the output voltage signal.

15. The voltage regulator of claim 14, further comprising:
a second transistor coupled between the first transistor and a ground reference terminal;
an oscillator operable to generate a switching signal; and
a latch operable to receive the switching signal, the latch coupled to a first gate terminal of the first transistor and coupled to a second gate terminal of the second transistor, the latch operable responsive to the error signal to generate a first drive signal and a second drive signal, the second drive signal complimentary with respect to the first drive signal and coupled to a second gate terminal of the second transistor.

16. The voltage regulator of claim 14, wherein the control circuitry is operable to add or subtract an offset voltage from one of the input voltage signal and the output voltage signal, operable to compare the results of the adding or subtracting to the other of the input voltage signal and the output voltage signal and operable to select between asserting a first predetermined signal output and asserting a second predetermined signal output based on the comparison.

17. The voltage regulator of claim 16, wherein the control circuitry includes switching mode logic operable to determine an operating mode of a device coupled to the output voltage signal and operable to select between asserting the first predetermined signal output and asserting the second predetermined signal output based on the output of the comparison and the determined operating mode.

* * * * *